United States Patent [19]

Purse et al.

[11] Patent Number: 5,417,549
[45] Date of Patent: May 23, 1995

[54] EXPANDABLE SPAR FILLER BLOCK DEVICE

[75] Inventors: Jeffry C. Purse, Branford; Michael E. Daniska, Bethel, both of Conn.

[73] Assignee: United Technologies Corporation, Hartford, Conn.

[21] Appl. No.: 212,454

[22] Filed: Mar. 11, 1994

[51] Int. Cl.$^6$ .............................................. B64C 27/473
[52] U.S. Cl. .................................. 416/226; 416/233; 416/248
[58] Field of Search ................... 416/134 A, 226, 233, 416/248; 403/367, 368, 370

[56] References Cited

U.S. PATENT DOCUMENTS

| | | | |
|---|---|---|---|
| 2,568,230 | 9/1951 | Gluhareff | 416/226 |
| 2,606,728 | 8/1952 | Sikorsky | 416/233 |
| 3,134,445 | 5/1964 | Hotchkiss | 416/226 |
| 3,168,144 | 2/1965 | Capowich et al. | 416/233 |

FOREIGN PATENT DOCUMENTS

| | | | |
|---|---|---|---|
| 733382 | 7/1955 | United Kingdom | 416/226 |

*Primary Examiner*—Edward K. Look
*Assistant Examiner*—James A. Larson
*Attorney, Agent, or Firm*—Terrance J. Radke

[57] ABSTRACT

An expandable spar filler block device for use in combination with a spar member of an articulated main rotor assembly of a helicopter. A preferred embodiment of the device includes first and second filler members and an expansion mechanism. Each filler member includes a spar engagement surface that is complementary to the inner mold line (IML) surfaces of the spar member and first and second tapered surfaces. The expansion mechanism for the preferred embodiment of the expandable spar filler block device is a pull shim that includes a first segment and a constant tapered segment having tapered surfaces that are complementary to the first tapered surfaces of the filler members. The spar engagement surfaces and the tapered surfaces of the constant tapered segment are coated with a paste adhesive, and the expandable spar filler block device is inserted in the spar cavity of the spar member with the coated spar engagement surfaces adjacent the IML surfaces defining the spar cavity and the coated tapered surfaces of the pull shim adjacent the first tapered surfaces of the filler members. The constant thickness segment of the pull shim is manipulated to exert a motive force that causes the tapered surfaces thereof to slidingly interact with the first tapered surfaces of the filler members such that the spar engagement surfaces are displaced into abutting engagement with the IML surfaces of the spar member.

10 Claims, 4 Drawing Sheets

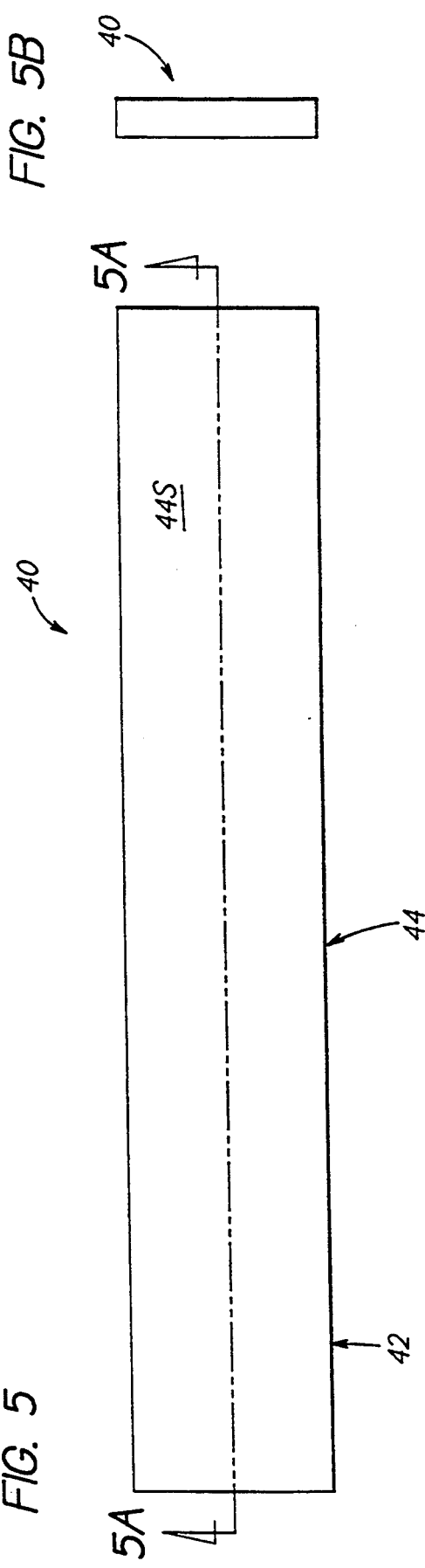
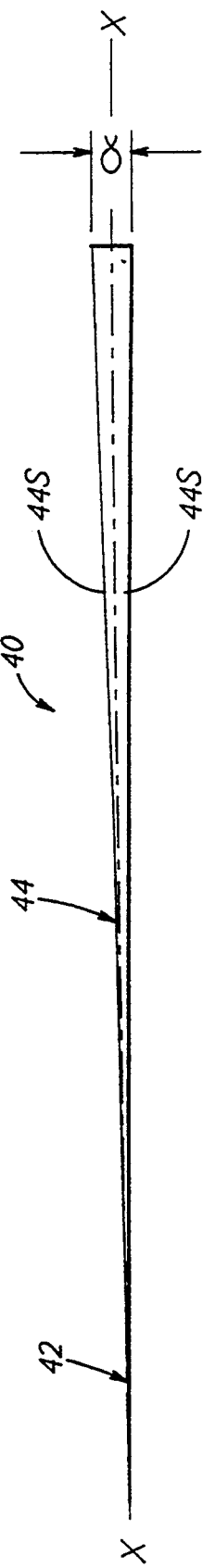
FIG. 5B
FIG. 5
FIG. 5A

EXPANDABLE SPAR FILLER BLOCK DEVICE

TECHNICAL FIELD

The present invention relates to an articulated helicopter main rotor assembly, and more particularly, to an expandable spar filler block device for use in combination with a spar member of an articulated main rotor assembly.

BACKGROUND OF THE INVENTION

An articulated main rotor assembly comprises a main rotor hub and a plurality of main rotor blades secured in combination therewith. An exemplary articulated main rotor assembly 100 is illustrated in FIG. 1 wherein reference numeral 102 identifies the main rotor hub and reference numeral 104 identifies a main rotor blade. Each main rotor blade 104 comprises an aerodynamic fairing 106 disposed in combination with an internal spar member 108. The internal spar member 108 functions as the primary load-carrying structural element of the main rotor blade 104, carrying most of the bending moments, twisting moments, shear, and centrifugal force induced in the main rotor blade 104.

Prior art spar members have typically been fabricated from titanium due to its high fatigue strength, torsional stiffness, and corrosion resistance. The trend in recent times, however, is to fabricate spar members as composite structures, e.g., a fibrous material such as graphite and/or fiberglass embedded in a resin matrix, due to the capability to fabricate a composite spar member having a torsional stiffness equivalent to its titanium counterpart, but at a significantly lower weight. In addition, a composite spar member is more advantageous in possessing almost twice the fatigue strain allowable of its titanium counterpart, as well as improved damage tolerance and attenuated crack propagation characteristics.

The spar member for an exemplary articulated main rotor assembly is an elongated structure that extends from the root to approximately the tip of the main rotor blade. The spar member has a closed tubular configuration for maximum torsional stiffness. The spar member functions as the attachment joint for securing the main rotor blade in combination with a cuff of the main rotor hub (the attachment joint and cuff are identified by reference numerals 110 and 112, respectively, in FIG. 1).

The cuff is typically bolted in combination with the spar member to secure the main rotor blade in combination with the main rotor hub. A problem encountered with this securement mechanism is that the compressive force generated by the torqueing of the bolts is coupled into the spar member. An excessive compressive force tends to bend or deform, i.e., collapse, a titanium spar member, which may degrade the load-carrying capability of the spar member. An excessive compressive force poses a more exacerbated problem in a main rotor assembly having composite spar members. An excessive compressive force may induce cracks into a composite spar member, degrading the load-carrying capability of the spar member and may lead to catastrophic failure thereof.

To counteract possible adverse effects due to the compressive force generated by attachment bolt torqueing, a solid one piece filler block 114, typically fabricated from a phenolic material for weight savings, is disposed in combination with the spar member 108. The filler block 114 is inserted in the spar cavity 116 at the root end 108R of the spar member 108 to abuttingly engage the inner mold line (IML) surfaces 108S of the spar member 108, as illustrated in FIG. 1A. The filler block 114 reacts the compressive forces generated by the bolt torqueing operation, thereby precluding compressive forces from being coupled into and deforming the spar member 108.

While a one-piece filler block is functionally adequate to protect the spar member from the adverse effects of compressive forces as a result of bolt torqueing, the forming of the filler block to net shape so that the inserted filler block abuttingly engages the IML surfaces of the spar member is both labor intensive and time consuming. Filler blocks are typically fabricated initially as rectangular blocks which are subsequently hand sanded to the required net shape. This typically involves an iterative process wherein the filler blocks are sanded, fitted, sanded, etc., until the required net shape is achieved. Such a procedure is per se labor intensive and time consuming. Another drawback with this procedure is that the filler block or segments thereof may be over sanded such that the filler block fits loosely in the spar cavity. Upon cuff bolt torqueing, the spar member may be slightly deformed, i.e., collapsed, due to the loose fit of the filler block. This could result in loss of bolt torque, undesirable changes in the shape of the airfoil fairing, or excessive stresses being induced into the spar member. The fitting of solid filler blocks is exacerbated for composite spar members. While the outer mold line (OML) of the composite spar member is tightly controlled, the IML surfaces of a composite spar member may have a rough, irregular surface texture, in addition to significantly large variations in spar inside dimensions due to composite material variations, e.g., resin content, fiber debulking, etc. In contrast, the inner surfaces of a titanium spar member have a smooth, flat texture. Rough, irregular IML surfaces pose a greater challenge in net shaping filler blocks, and increase the likelihood that the spar member may be subjected to deleterious effects during bolt torqueing.

A need exists to provide a filler device that reacts bolt torqueing to preclude induced deformation of the spar member. The filler device should be fittable within the spar cavity to abuttingly engage the inner surfaces of the spar member without the need for labor intensive and time consuming rework of the external configuration thereof. The filler device should be compatible for use in combination with the rough, irregular IML surfaces of a composite spar member as well as the smooth, flat inner surfaces of a titanium spar member.

SUMMARY OF THE INVENTION

Objects of the present invention include providing an expandable spar filler block device for use in combination with a spar member of an articulated main rotor assembly of a helicopter that is easily inserted in the spar cavity of the spar member, that is readily expandable to abuttingly engage inner mold line (IML) surfaces defining the spar cavity of the spar member, that is operative to react bolt torqueing to preclude deformation of the spar member during securement thereof in combination with the main rotor hub of the articulated main rotor assembly, and that is usable in combination with composite spar members, titanium spar members, or spar members formed from other materials having a diverse variety of IML surface configurations.

These and other objects of the present invention are provided by an expandable spar filler block device according to the present invention that includes first and second filler members and a means for expanding the spatial separation between the first and second filler members. The first and second filler members of the preferred embodiment of the expandable spar filler block device each include a spar engagement surface that is complementary to the IML surfaces of the spar member, a first tapered surface having a predetermined taper angle, and a second tapered surface having a predetermined taper angle and contiguous with the first tapered surface. The expansion means for the preferred embodiment is a pull shim having a first segment and a constant tapered segment having tapered surfaces that define a taper angle complementary to the taper angles of the first tapered surfaces of the first and second filler members.

The spar engagement surfaces of the first and second filler members and the tapered surfaces of the pull shim are coated with a paste adhesive, and the expandable spar filler block device is installed in the spar cavity of the spar member with the coated spar engagement surfaces adjacent the IML surfaces of the spar member and the coated tapered surfaces adjacent the first tapered surfaces of the first and second filler members. A motive force is exerted on the first segment of the pull shim to cause sliding interaction between the coated tapered surfaces of the pull shim and the first tapered surfaces of the first and second filler members. Sliding interaction between these surfaces causes a spatial displacement between the spar engagement surfaces to abuttingly engage the IML surfaces of the spar member.

BRIEF DESCRIPTION OF THE DRAWINGS

A more complete understanding of the present invention and the attendant features and advantages thereof may be had by reference to the following detailed description of the invention when considered in conjunction with the accompanying drawings wherein:

FIG. 1A is a cross-sectional view taken along line 1A—1A of FIG. 1 illustrating a prior art spar filler block.

FIG. 5 is a top plan view of an expansion mechanism for the expandable spar filler block device of FIG. 3.

FIG. 5A is a cross-sectional view taken along line 5A—5A of FIG. 5.

FIG. 5B is an end plan view of the expansion mechanism of FIG. 5.

DETAILED DESCRIPTION OF PREFERRED EMBODIMENTS

Figure 3:
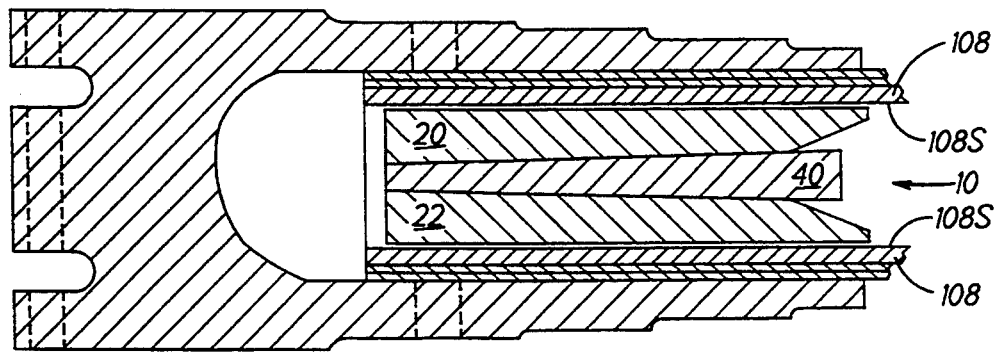
FIG. 3 is a cross-sectional view illustrating a preferred embodiment of an expandable spar filler block device according to the present invention.
Figure 6:
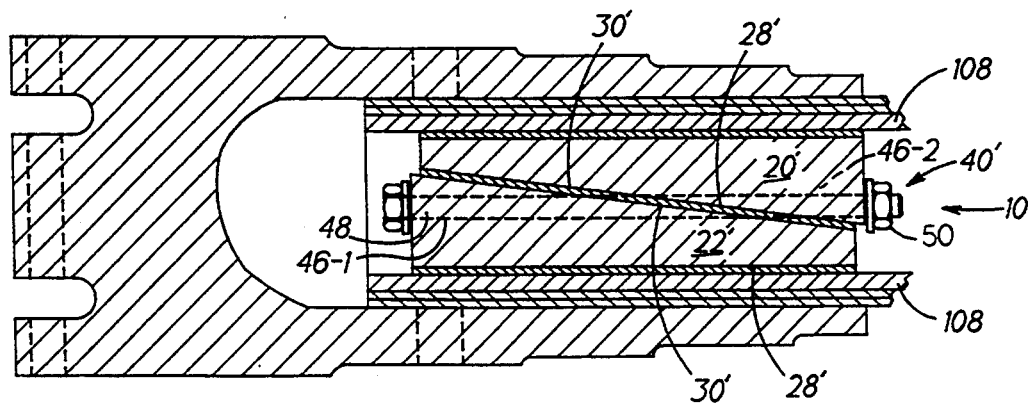
FIG. 6 is a cross-sectional view illustrating another embodiment of an expandable spar filler block device according to the present invention.
Figure 4:
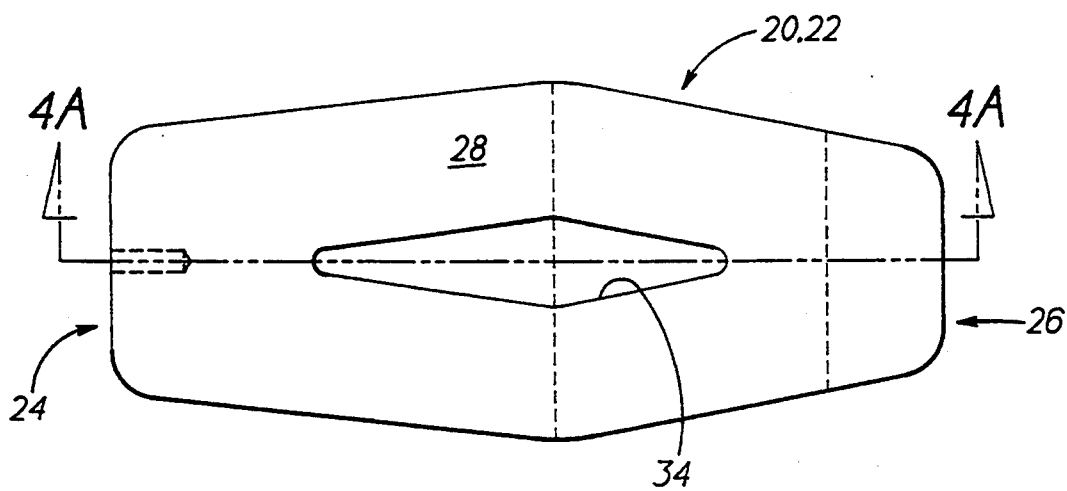
FIG. 4 is a top plan view of one beveled filler member of the expandable spar filler block device of FIG. 3.

Referring now to the drawings wherein like reference numerals identify corresponding or similar elements throughout the several views, FIGS. 3–5 illustrate a preferred embodiment of an expandable spar filler block device 10, and FIG. 6 illustrates another embodiment of an expandable spar filler block device 10'. The expandable spar filler block device according to the present invention is readily expandable to abuttingly engage the inner mold line (IML) surfaces of a spar member. The expandable spar filler block device is operative to react bolt torqueing to preclude deformation and possible catastrophic failure of the spar member when secured in combination (e.g., bolted connection) with a helicopter main rotor hub. The expandable spar filler block device according to the present invention is usable in combination with composite spar members, titanium spar members, or spar members formed from other materials.

Figure 1:
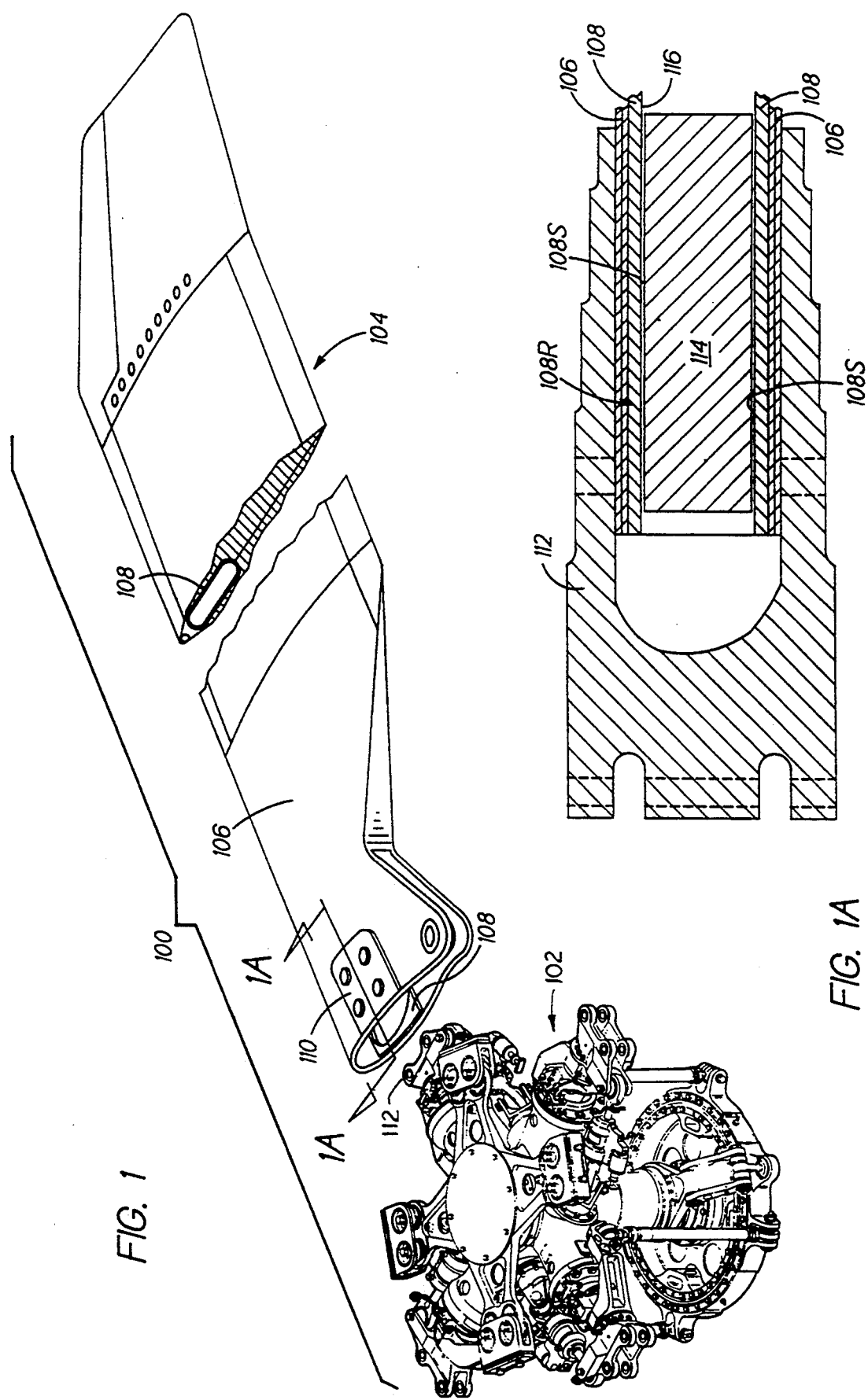
FIG. 1 is a perspective, partial view of a helicopter main rotor assembly.
Figure 2:
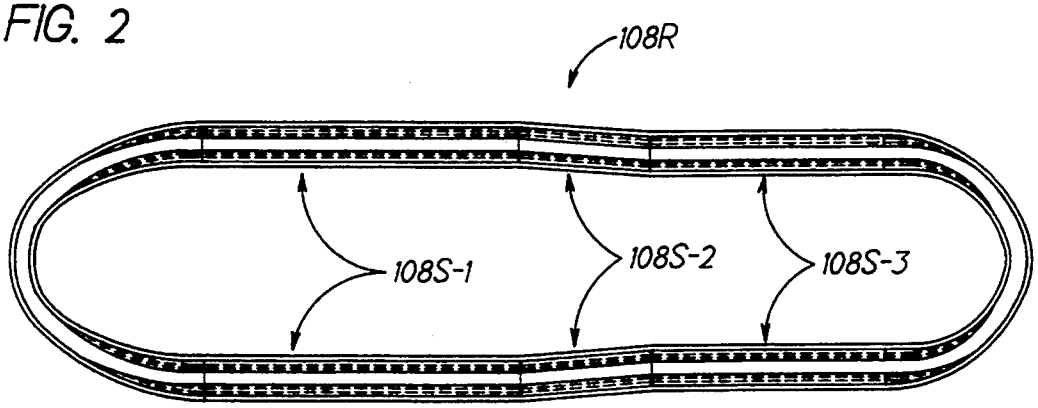
FIG. 2 is a cross-sectional view illustrating the root end configuration of the composite spar member for the UH-60 growth main rotor blade.

The preferred embodiment of the expandable spar filler block device 10 described herein is configured for use in combination with the composite spar member of the growth main rotor blade for the UH-60 BLACK HAWK ® (BLACK HAWK is a registered trademark of the Sikorsky Aircraft division of United Technologies Corporation) helicopter. FIG. 2 is a cross-sectional view illustrating the configuration of the root end 108R of the growth blade spar member, and in particular, the compound curvature of the IML surfaces of the root end 108R, which are identified by reference characters 108S-1, 108S-2, and 108S-3 in FIG. 2. One skilled in the art will appreciate that the expandable spar filler block device according to the present invention can be used in combination with spar members having a wide variety of IML surface configurations. As used herein, IML surfaces comprises the inner surfaces of the spar member that defines the spar member, and includes the inner surfaces of a titanium spar member as well as a composite spar member.

Figure 4A:
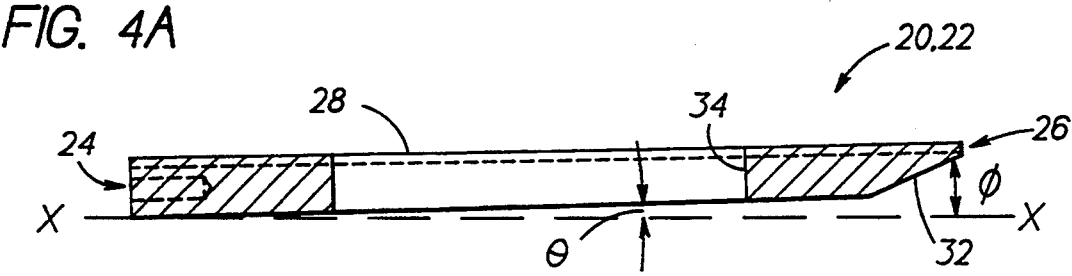
FIG. 4A is a cross-sectional view taken along line 4A—4A of FIG. 4.
Figure 4B:
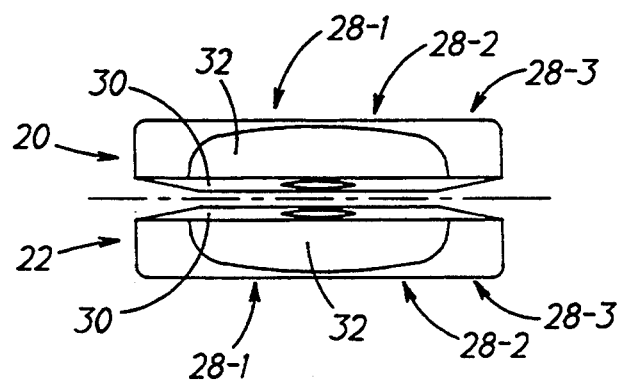
FIG. 4B is an end plan view of a pair of beveled filler members of the preferred embodiment of the expandable spar filler block device according to the present invention.

The expandable spar filler block device 10 has overall external dimensions that are commensurate with the insertion thereof in the spar cavity of the spar member. The expandable spar filler block device 10 comprises first and second beveled filler members 20, 22 and a means 40 for expanding the first and second beveled filler members 20, 22. The term expanding and variations thereof as used in the present context define a capability for adjusting the spatial separation between the first and second beveled filler members 20, 22 as described in further detail hereinbelow. An examination of FIG. 4B illustrates that the first and second beveled filler members 20, 22 have an identical configuration that includes a root end 24, a tapered end 26, a spar engagement surface 28, a first tapered surface 30, a second tapered surface 32, and an internal cutout 34. While the first and second beveled filler members 20, 22 have identical configurations in the described embodiment, one skilled in the art will appreciate that the first and second beveled filler members may have dissimilar configurations, depending primarily upon the configuration of the IML surfaces of the spar member.

The spar engagement surface 28 of each beveled filler member 20, 22 is complementary to the corresponding IML surfaces of the spar member. As most clearly seen in FIG. 4B, the spar engagement surfaces 28-1, 28-2, 28-3 correspond to the IML surfaces 108S-1, 108S-2, 108S-3, respectively, of the spar member illustrated in FIG. 2. The complementary configuration of the spar engagement surfaces 28 ensures a form fitting abutting engagement of the beveled filler members 20, 22 with the IML surfaces of the spar member to prevent deformation thereof during bolt torqueing.

The first and second tapered surfaces 30, 32 of the beveled filler members 20, 22 are disposed in opposed relation (see FIG. 4B). The second tapered surfaces 32 have a predetermined taper angle $\theta$ with respect to the longitudinal axis X—X of the members 20, 22 (see FIG. 4A) and are operative in combination to facilitate insertion of the expansion means 40 in intermediate combination with the first and second beveled filler members 20, 22 (see FIG. 3). The taper angle $\theta$ of the second tapered surfaces 32 for the described embodiment is about 20°. The first tapered surfaces 30 have a predetermined taper angle $\phi$ with respect to the longitudinal axis X—X of the members 20, 22 (see FIG. 4A) and slidingly interact in combination with the expansion means 40 to expand the spar filler block device 10 so that the spar engagement surfaces 28 thereof abuttingly engage the corresponding IML surfaces of the spar member. That is, the sliding interaction between the first tapered surfaces 30 and the expansion means 40 produces a relative displacement between the spar engagement surfaces 28 of the first and second beveled filler members 20, 22. The taper angle $\phi$ of the first tapered surfaces 30 of the described embodiment is about 0°45'.

While the expandable spar filler block device 10 is necessary to preclude deformation of the spar member, the device 10 is deadweight from a helicopter performance standpoint. The beveled filler members 20, 22, therefore, are preferably fabricated from a rigid material of low density to minimize the overall weight of the expandable spar filler block device 10. For the preferred embodiment described herein, the beveled filler members 20 are fabricated from a phenolic material. For example, one or more fibrous laminates such as cotton cloth are embedded in matrix of resole or novolac resin and mold cured to form net-shaped phenolic beveled filler members 20, 22. Alternatively, the fibrous laminate embedded in a resin matrix is cured to form phenolic blocks, which are subsequently machined to form the net-shaped beveled filler members 20, 22. The fiber orientation of the fibrous laminate embedded within the resin matrix is preferably substantially parallel (within $\pm 5°$) to the longitudinal axis X—X the of the beveled filler members 20, 22.

For the preferred embodiment of the expandable spar filler block device 10 illustrated in FIGS. 3–5, the expansion means 40 is a pull shim having a generally tapered configuration as illustrated in FIG. 5, 5A, 5B. The pull shim 40 includes a first segment 42, e.g., a constant thickness segment, and a constant tapered segment 44. With the pull shim 40 disposed intermediate the first and second beveled filler members 20, 22, the constant thickness segment 42 extends outwardly of the root end of the spar member, and is manipulable to provide the motive force to cause sliding interaction between the pull shim 40 and the first tapered surfaces 30 of the first and second beveled filler members 20, 22. The constant tapered segment 44 has a predetermined taper angle $\alpha$ (see FIG. 5A) that is complementary to the taper angle $\phi$ of the first tapered surfaces 30. For the preferred embodiment described herein, the taper angle $\Phi$ is about 1.5°. The tapered surfaces 44S of the pull shim 40 slidingly interact with the first tapered surfaces 30 of the first and second beveled filler member 20, 22 to cause a relative displacement between the respective spar engagement surfaces 28 such that the surfaces 28 abuttingly engage the IML surfaces of the spar member.

The pull shim 40 is preferably fabricated from composite material such as woven fibrous laminates, e.g., fiberglass, embedded in a resin matrix for enhanced mechanical strength. The layed-up composite laminates are mold cured to net shape since this is the most expeditious fabrication technique. The laminates are layed-up to provide the pull shim 40 with the necessary strength to accommodate the manipulation thereof to provide the motive force to cause the sliding interaction between the pull shim 40 and the first tapered surfaces 30 of the first and second beveled filler members 20, 22. For the described embodiment, the outer laminates extend the length of the pull shim 40 and have a fiber orientation of 0/90° with respect to the longitudinal axis (reference characters X—X in FIG. 5A) of the pull shim 40. One inner laminate having a fiber orientation of $\pm 45°$ is continuous over the length of the pull shim 40. The remaining inner laminates forming the pull shim 40 have a fiber orientation of $\pm 45°$ and varying lengths to provide the predetermined taper of the tapered surfaces 44. The number of inner laminates of varying length is varied as required to meet the dimensional envelope requirements of the pull shim 40.

Prior to installation of the expandable spar filler block device 10 in combination within the spar cavity of the spar member, the spar engagement surfaces 28 of the first and: second filler members 20, 22 and the tapered surfaces 44S of the pull shim 40 are coated with an epoxy-based paste adhesive that is characterized by room-temperature curing. For example, one such paste adhesive having utility for use in combination with the expandable spar filler block device 10 is Hysol EA9309.3NA manufactured by the Dexter Corporation. Then, the first and second filler members 20, 22 are installed with the coated spar engagement surfaces 28 adjacent the IML surfaces of the spar member, and the pull shim 40 is inserted intermediate the first and second filler members 20, 22 with the coated tapered surfaces 44S adjacent the first tapered surfaces 30. In the installed condition, the constant thickness segment 42 of the pull shim 40 extends beyond the root end of the spar member. The constant thickness segment 42 is then manipulated to exert a motive force that causes the coated tapered surfaces 44S to slidingly interact with the first tapered surfaces 30 wherein the spar engagement surfaces 28 are displaced into abutting engagement with the respective IML surfaces of the spar member. The expandable spar filler block device 10 is maintained in the expanded condition to allow the paste adhesive to cure. The cured adhesive prevents any subsequent relative motion among the first and second filler members 20, 22 and the pull shim 40. Finally, the portion of the constant 2 thickness segment 42 extending beyond the root ends 24 of the first and second filler members 20, 22 is severed. With the expandable spar filler block device 10 installed in the spar member, attachment holes are drilled through the spar member and installed block device 10. The main rotor blade is now configured for installation in a cuff of the main rotor hub and securement thereto by means of bolted connections.

Another embodiment of an expandable spar filler block device 10' according to the present invention is illustrated in FIG. 6 and includes first and second filler members 20', 22' and an expansion means 40'. Each filler member 20', 22' has a spar engagement surface 28' and a beveled surface 30' and includes a channel 46-1, 46-2, respectively, formed therethrough. The expansion means 40' for the embodiment of FIG. 6 is a jackscrew that includes a threaded bolt 48 disposed for rotation within the channels 46-1, 46-2 and a captured nut 50 secured in combination with one of the filler members 20', 22' (filler member 20' as illustrated in FIG. 6). Prior to the installation of the expandable spar filler block device 10' in the cavity of the spar member, the spar engagement and beveled surfaces 28', 30' of each filler member 20', 22' are coated with a paste adhesive of the type described hereinabove. With the expandable spar filler block device 10' inserted within the spar cavity of the spar member, the jackscrew 40', is actuated by rotating the threaded bolt 48. Activation of the jackscrew 40' causes a sliding interaction between the beveled surfaces 30' of the first and second filler members 20', 22'. Such sliding interaction causes a relative displacement between the respective spar engagement surfaces 28' such that the surfaces 28' abuttingly engage the respective IML surfaces of the spar member. After the paste adhesive has cured, the threaded bolt 48 may be removed from the first and second filler members 20', 22'.

A variety of modifications and variations of the present invention are possible in light of the above teachings. It is therefore to be understood that, within the scope of the appended claims, the present invention may be practiced otherwise than as specifically described hereinabove.

What is claimed is:

1. An expandable spar filler block device for use in combination with a spar member of an articulated main rotor assembly of a helicopter, the spar member having inner mold line surfaces that define a spar cavity, comprising:
    a first filler member having a spar engagement surface that is complementary to the inner mold line surfaces of the spar member and a first tapered surface having a predetermined taper angle;
    a second filler member having a spar engagement surface that is complementary to the inner mold line surfaces of the spar member and a first tapered surface having a predetermined taper angle; and
    expansion means for interacting with said first and second filler members to cause a relative displacement between said spar engagement surfaces with said expandable spar filler block device inserted in the spar cavity such that said spar engagement surfaces abuttingly engage the inner mold line surfaces of the spar member.

2. The expandable spar filler block device of claim 1 wherein said expansion means is a pull shim having a constant thickness segment and a constant tapered segment having tapered surfaces that define a predetermined taper angle that is complementary to said predetermined taper angles of said first and second filler members, said tapered surfaces of said constant tapered segment slidingly interacting with said first tapered surfaces to cause said relative displacement between said spar engagement surfaces.

3. The expandable spar filler block device of claim 1 wherein said predetermined taper angle of said first tapered surface of said first filler member is about 45' and wherein said predetermined taper angle of first tapered surface of said second filler member is about 45'.

4. The expandable spar filler block device of claim 2 wherein said predetermined taper angle defined by said tapered surfaces of said constant tapered segment is about 1.5°.

5. The expandable spar filler block device of claim 1 wherein said first filler member includes a second tapered surface having a predetermined taper angle and contiguous with said first tapered surface, and wherein said second filler member includes a second tapered surface having a predetermined taper angle and contiguous with said first tapered surface.

6. The expandable spar filler block device of claim 5 wherein said predetermined taper angle of said second tapered surface of said first and second filler members is about 20°.

7. The expandable spar filler block device of claim 1 wherein said first and second filler members are formed from a phenolic material and said expansion means is a pull shim fabricated from fibrous laminates embedded in a resin matrix.

8. The expandable spar filler block device of claim 1 wherein each said first and second filler members has a cutout segment removed therefrom.

9. The expandable spar filler block device of claim 1 wherein each said first and second filler members has a channel formed therethrough, and wherein said expansion means is a jackscrew that includes a threaded bolt rotatably inserted in said channels of said first and second filler members and a captured nut secured in non-rotatable combination with one of said first and second filler members and engaged with said threaded bolt, actuation of said jackscrew by rotating said bolt member causing sliding interaction between said first tapered surfaces of said first and second filler members to cause said relative displacement between said spar engagement surfaces thereof.

10. An expandable spar filler block device for use in combination with a spar member of an articulated main rotor assembly of a helicopter, the spar member having inner mold line surfaces that define a spar cavity, comprising:
    a first filler member having a spar engagement surface that is complementary to the inner mold line surfaces of the spar member, a first tapered surface having a predetermined taper angle; and a second tapered surface having a predetermined taper angle and contiguous with said first tapered surface;
    a second filler member having a spar engagement surface that is complementary to the inner mold line surfaces of the spar member, a first tapered surface having a predetermined taper angle; and a second tapered surface having a predetermined taper angle and contiguous with said first tapered surface; and
    a pull shim having a first segment and a constant tapered segment having tapered surfaces that define a predetermined taper angle that is complementary to said predetermined taper angles of said first tapered surfaces of said first and second filler members;
    said pull shim being disposed intermediate said first and second filler members with said tapered surfaces of said pull shim in abutting engagement with said first tapered surfaces of said first and second filler members to form said expandable spar filler block device.

* * * * *